United States Patent [19]

Aoyama

[11] Patent Number: 5,796,775
[45] Date of Patent: Aug. 18, 1998

[54] PATH-DIVERSITY CDMA RECEPTION BY DETECTING LOWER-PEAK CORRELATION SEQUENCE FOLLOWING REMOVAL OF HIGHER-PEAK SEQUENCES

[75] Inventor: Akio Aoyama, Tokyo, Japan

[73] Assignee: NEC Corporation, Tokyo, Japan

[21] Appl. No.: 880,381

[22] Filed: Jun. 23, 1997

[30] Foreign Application Priority Data

Jun. 21, 1996 [JP] Japan .................................. 8-162097

[51] Int. Cl.$^6$ .......................... H04K 1/00; H04B 1/707
[52] U.S. Cl. .................... 375/208; 375/205; 375/347; 370/342
[58] Field of Search ........................... 375/205, 208, 375/347, 206; 370/342

[56] References Cited

U.S. PATENT DOCUMENTS 5,598,428   1/1997   Sato ........................................ 375/206
5,648,983   7/1997   Kostic et al. ........................... 375/206

Primary Examiner—Temesghen Ghebretinsae
Attorney, Agent, or Firm—Scully, Scott, Murphy & Presser

[57] ABSTRACT

In a DS-CDMA receiver, successively time shifted replicas of a despreading sequence are used to detect correlations with a received chip sequence and resulting correlation sequences are stored in a memory. A correlation sequence having a maximum peak and correlation sequences having side peaks inherently associated with the maximum peak are detected in the memory and all of the detected correlation sequences are removed from the memory. Following this removal, a correlation sequence having a maximum peak is detected from the remaining correlation sequences and the timing of the correlation sequence is determined. A despreading sequence which is delayed in accordance with the determined timing is produced and the chip sequence is despread with the delayed despreading sequence to produce a diversity branch signal.

17 Claims, 3 Drawing Sheets

PATH-DIVERSITY CDMA RECEPTION BY DETECTING LOWER-PEAK CORRELATION SEQUENCE FOLLOWING REMOVAL OF HIGHER-PEAK SEQUENCES

BACKGROUND OF THE INVENTION

1. Field of the Invention

The present invention relates generally to direct sequence spread spectrum, or DS-CDMA (code division multiple access) receivers, and more specifically to path-diversity reception of a DS spread spectrum signal propagated on multiple radio paths.

2. Description of the Related Art

Diversity reception of a direct sequence spread spectrum signal involves the detection of correlations (comparisons) between a received chip sequence and a despreading sequence on a chip-by-chip basis and the detection of the time instant of a correlation sequence having a maximum value as the sync timing of the chip sequence. The correlation sequence is a convolution integral of the auto-correlation of the despreading sequence and a channel impulse response and is usually represented by a complex value. If the transmitted signal undergoes multiple reflections and so it propagates along radio paths of different channel responses, the correlation sequences have different peaks at different time instants respectively corresponding to the channel responses of the radio paths. The signal of highest strength has a maximum peak at zero timing point in a spectrum of correlation sequences and a weaker signal has a lower peak at a point shifted a two-chip interval, for example, from the zero timing point. For establishing synchronization for the multipath signals, it is the usual practice to detect the peak values in descending order of their strength.

Although satisfactory for chip sequences where the chip interval is relatively long, the prior art approach is not satisfactory for the signal having relatively short chip intervals due to the presence of side peaks which accompany the main peak as inherent side products. If the side peaks are higher than die main peak of a multipath signal, an out-of-sync condition will result.

SUMMARY OF THE INVENTION

It is therefore an object of the present invention to provide successful path-diversity reception of multipath CDMA signals even though the chip sequence of the signals have side peaks.

The object of the present invention is attained by removal of correlation sequences of higher peaks followed by the detection of a correlation sequence having a lower peak.

According to a first aspect of the present invention, there is provided a path-diversity CDMA receiver in which comprises a spread spectrum radio frequency signal is received and a chip sequence is produced. A despreading sequence of the receiver is produced by a pseudo-noise (PN) sequence generator and a plurality of successively time shifted replicas of the despreading sequence is produced. A plurality of correlators are provided for detecting correlations between the chip sequence and the time shifted replicas of the despreading sequence to produce a plurality of correlation sequences, one of the correlation sequences which is produced corresponding to an intermediate one of the time shifted replicas having a maximum peak. The correlation sequences are stored in a memory. A control logic, connected to the memory, detects a correlation sequence having the maximum peak and correlation sequences having side peaks inherently associated with the maximum peak and removes all the detected sequences from the memory. The control logic proceeds to detect a correlation sequence having a maximum peak among the correlation sequences remaining in the memory and produces a timing control signal corresponding to the detected correlation sequence. A variable delay introduces a delay to the despreading sequence from the PN sequence generator in accordance with the timing control signal. The delayed despreading sequence is used by a despreader to despread the chip sequence to produce a diversity branch signal.

According to a second aspect, the present invention provides a method for producing a diversity branch signal from a chip sequence transmitted by a spread spectrum radio frequency signal propagating on multiple radio paths. The method comprises the steps of producing a plurality of successively time shifted replicas of a despreading sequence, detecting correlations between the chip sequence and the time shifted replicas and producing therefrom a plurality of correlation sequences, one of the correlation sequences which corresponds to an intermediate point of the time shifted replicas having a maximum peak and storing the correlation sequences in a memory. A correlation sequence having a maximum peak and correlation sequences having side peaks inherently associated with the maximum peak are detected in the memory and all of the detected correlation sequences are removed from he memory. A correlation sequence having a maximum peak is then detected from the remaining correlation sequences and the riming of the correlation sequence is determined. A despreading sequence which is delayed in accordance with the determined timing is produced and the chip sequence is despread with the delayed despreading sequence to produce the diversity branch signal.

According to a third aspect, the present invention provides a method for producing a diversity branch signal from a chip sequence transmitted by a spread spectrum radio frequency signal propagating on multiple radio paths. The method comprises the steps of:

a) producing a policy of successively time shifted replicas of a despreading sequence;

b) detecting correlations between the chip sequence and the time shifted replicas and producing therefrom a plurality of correlation sequences, one of the correlation sequences which corresponds to an intermediate point of the time shifted replicas having a maximum peak;

c) storing the correlation sequences in a memory;

d) setting a variable n to 1;

e) detecting, in the memory, a correlation sequence having a maximum peak and identifying the correlation sequence having the maximum peak as an nth correlation sequence;

f) incrementing the variable n by 1;

g) removing the (n-1)th correlation sequence from the memory;

h) detecting, in the memory, correlation sequences having side peaks inherently associated with the maximum peak of the (n-1)th correlation sequence and removing the detected correlation sequences from the memory;

i) repeating the step (e) to detect a correlation sequence having a maximum peak;

j) determining the timing of the detected correlation sequence and producing a despreading sequence delayed according to the determined timing;

k) repeating the steps (e) to (j) to produce a plurality of the delayed despreading sequences; and l) despreading the chip sequence with the plurality of delayed despreading sequences to produce a plurality of the diversity branch signals.

BRIEF DESCRIPTION OF THE DRAWINGS

The present invention will be described in further detail with reference to the accompanying drawings, in which.

DETAILED DESCRIPTION

Figure 1:
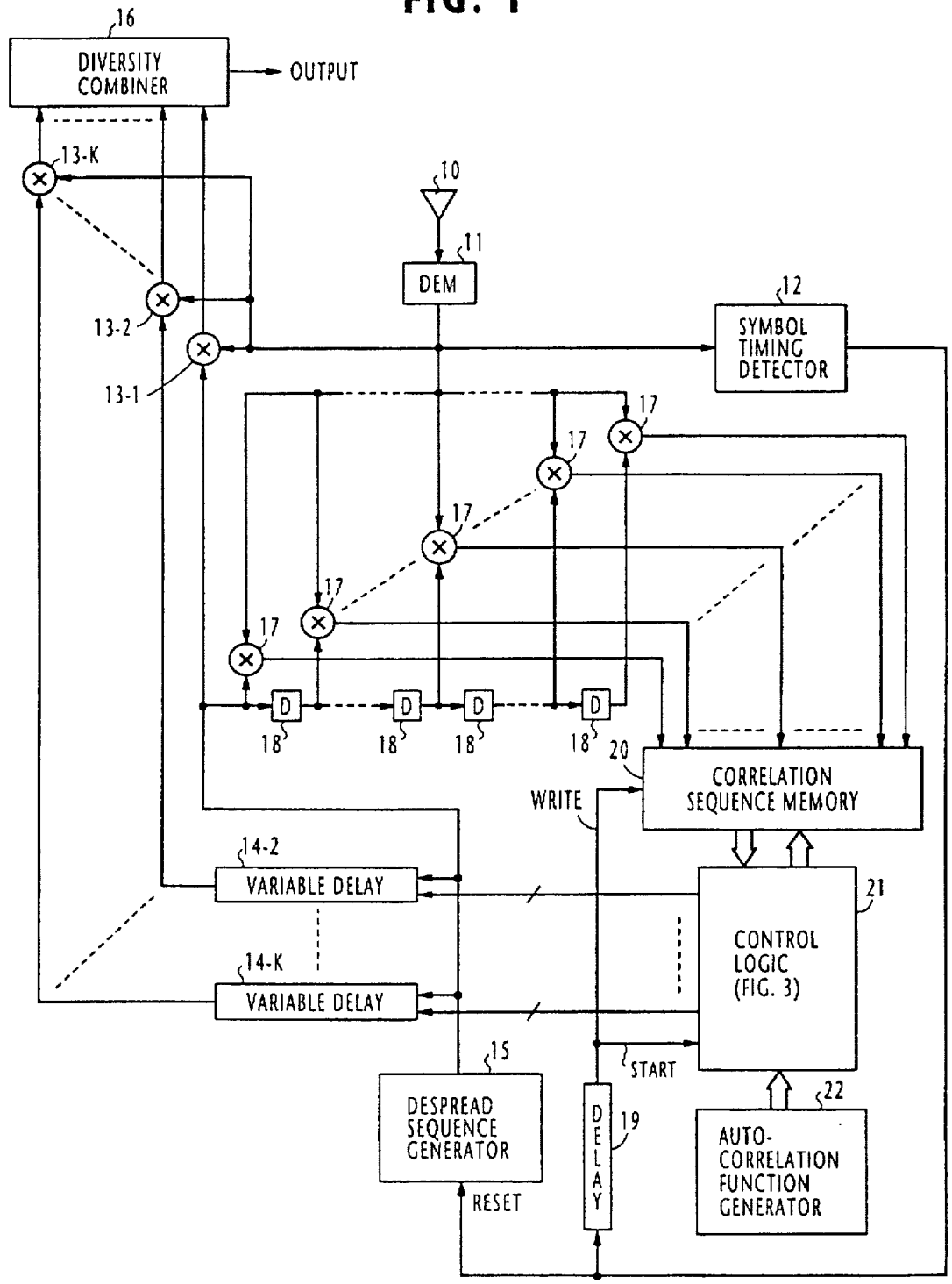
FIG. 1 is a block diagram of a path-diversity DS-CDMA. (direct sequence code division multiple access) receiver according to the present invention.

Referring now to FIG. 1, there is shown a path-diversity DS-CDMA receiver according to the present invention. A direct-sequence spread spectrum radio frequency signal, received at antenna 10, is converted by a demodulator 11 to a baseband chip sequence, which is applied to a symbol timing detector 12. The chip sequence is also fed to despreader, or multipliers 13-1 through 13-K which respectively correspond to radio paths on which the transmitted signal may be propagated due to multiple reflections. Symbol timing detector 12 is implemented with a known technique. One example is a matched filter which produces a logic-1 output when the symbol timing of the incoming chip sequence is marched to the receiver's despreading PN (pseudo-noise) sequence. This despreading sequence is produced by a despread sequence generator 15 and directly supplied to multiplier 13-1. When the symbol timing detector produces a logic-1 output, the despread sequence generator 15 is reset so that the start timing of the despreading sequence is time-coincident with the symbol timing of the strongest chip sequence. Multiplier 13-1 uses the time-coincident despreading sequence to recover the strongest signal for coupling to a diversity combiner 16.

The output of despread sequence generator 15 is fed to the input end of a tapped-delay line formed by a series of delay elements 18, each introducing a delay corresponding to a "subchip" interval "r", i.e., an integral submultiple of chip interval $T_c$. A plurality of successively time shifted replicas of the despreading sequence are produced at subchip intervals "r" along the taps of the delay line. The incoming chip sequence is further supplied to a plurality of correlators, or multipliers 17 where it is multiplied by the despreading sequences from the tapped-delay line. As a result, a plurality of correlation sequences are produced in his way by multipliers 17.

The logic-1 output of symbol timing detectors 19 is further coupled to a delay element 19 where it is delayed by an interval corresponding to the length of time the despreading sequence takes to travel from the input end of the capped-delay line to its center tap. The output of delay element 19 is supplied to a correlation sequence memory 20, which uses it as a write command to store the correlation sequences produced by multipliers 17. It is seen therefore that the correlation sequence delivered from the center-tap multiplier has a maximum (mainlobe) correlation value and correlation sequences having side peaks inherently associated with the mainlobe appear on both sides of the maximum correlation sequence.

The output of despread sequence generator 15 is also supplied via variable delay elements 14-2 to 14-K to multipliers 13-2 to 13-K, respectively. Variable delay elements 14-2 through 14-K are controlled by the control logic 21 to introduce certain amounts of delay to the despread PN sequence in order to allow multipliers 13-2 to 13-K to despread the incoming chip sequence at rime instants which are matched to lower strength signals propagating on the multiple radio paths. The outputs of multipliers 13-2 to 13-K are coupled to the diversity combiner 16 to produce a diversity-combined signal. As will be understood, the diversity combiner 16 is sequentially supplied with output signals from despreaders 13-1 through 13-K in descending order of their strength, with the signal from multiplier 13-1 being the strongest and that from multiplier 13-K being the weakest.

Figure 2:
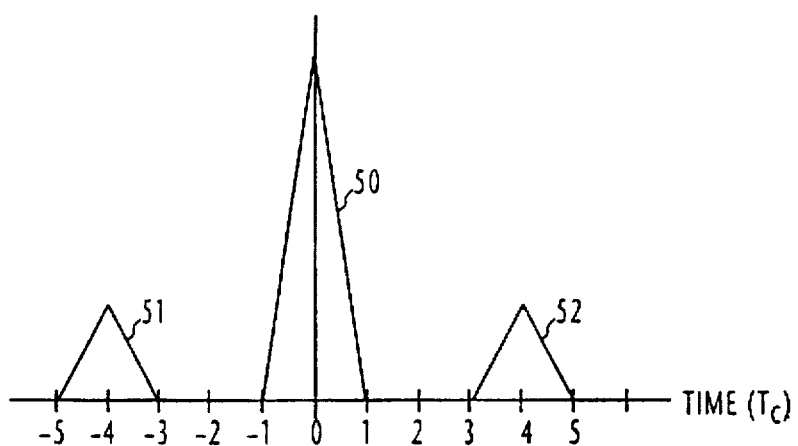
FIG. 2 is a graphic representation of an auto-correlation of the receiver's despread PN sequence.

The output of delay element 19 is also used as a start command signal for instructing a control logic 21 to start processing the correlation sequences stored in the memory 20 by using an auto-correlation function of the receiver's despread PN sequence produced by an auto-correlation function generator 22. In general, auto-correlation is defined by a convolution integral as a measure of similarity between a signal and a time-shifted replica of itself. As illustrated in FIG. 2, the auto-correlation function has a mainlobe 50 at the zero sync timing of the time scale which is divided into chip intervals $T_c$ and sidelobes 51 and 52 which appear at $\pm 4T_c$ inherent to mainlobe 50. The timing at which the sidelobes occur is false timing and must be distinguished from the timing of a diversity branch signal.

Figure 3:
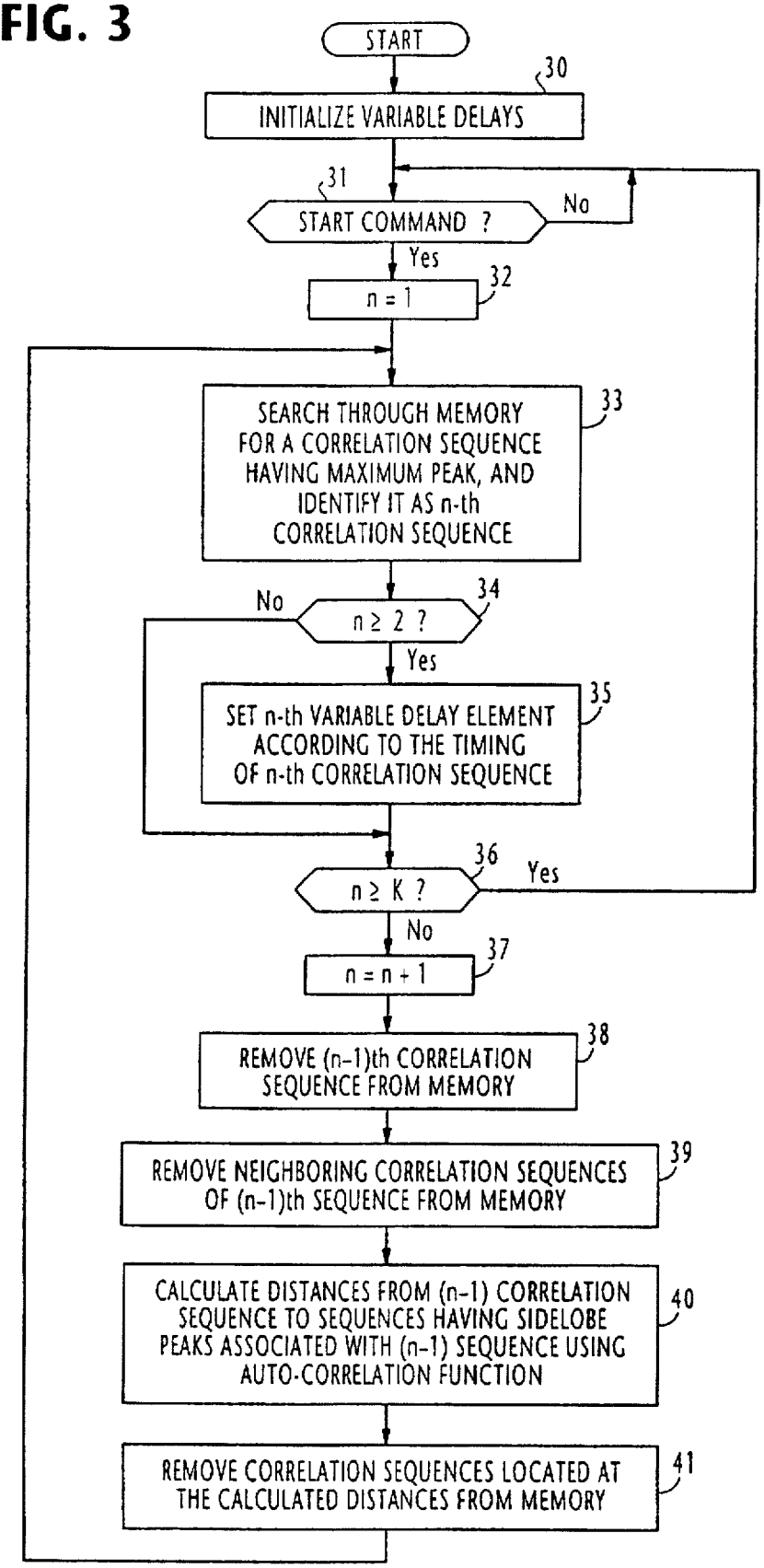
FIG. 3 is a flowchart of the operation of the control logic of FIG. 1.

In order to prevent the multipliers 13 from synchronizing to the false sidelobe timing the control logic 21 operates in accordance with the flowchart of FIG. 3.

In FIG. 3, die operation of control logic 21 starts with step 30 where it initializes the settings of variable delay elements 14-2 through 14-K. At step 31, control logic 21 checks to see if a start command is received. If so, flow proceeds from step 31 to step 32 to set a variable "n" to 1. At step 33, memory 20 is searched for a correlation sequence having a maximum peak and this sequence is identified as nth correlation sequence. Flow proceeds to decision step 34 to determine whether the variable "n" is equal to or greater than 2. If not, flow branches off to step 36. If the answer is affirmative at step 34, flow branches off to step 35 to set the nth variable delay element 14-n according to the timing of the nth correlation sequence, where the "n" is greater than 1.

At step 36, the variable "n" is checked to see if it is equal to or greater than the integer K, i.e. the number of radio paths which may be taken by the arriving signal. If the decision at step 36 is affirmative, control returns to step 31. Otherwise, it proceeds to step 37 to increment the variable "n" by 1.

The (n-1)th correlation sequence is removed from memory 20 at step 38, and "m" neighboring correlation sequences of the (n-1)th correlation sequence are removed from the memory (step 39). If n=2, the first correlation sequence detected at step 33 as having the maximum peak and its neighboring sequences are now nonexistent in memory 20.

At step 40, the subchip distances from the (n-1)th correlation sequence to sequences having sidelobe peaks which are associated with the (n-1)th correlation sequence are calculated using the auto-or relation function. At step 41, the correlation sequences located at the distances calculated at step 40 are removed from memory 20.

Figure 4:
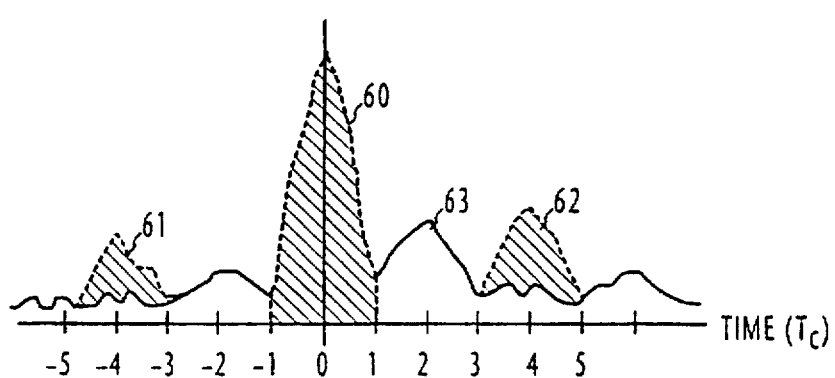
FIG. 4 is a graphic representation of a typical example of a correlation sequence spectrum.

When steps 38 to 41 are first executed, correlation sequences having mainlobe 60 and sidelobes 61 and 62 are removed from memory 20 as illustrated in FIG. 4.

Following the execution of step 41, flow returns to step 33 to make a search through correlation sequences that remain in the memory and detects a correlation sequence having a maximum value. This sequence is now identified as a new nth correlation sequence. When step 33 is executed second time, the decision at subsequent step 34 is affirmative, and flow proceeds to step 35 to set the nth variable delay element 14 according to the subchip timing of the nth correlation sequence. If the incoming signal contains a second strongest (diversity branch) signal arriving on a path with a propagation delay of $2T_c$, it occurs as indicated by numeral 63 in FIG. 4. Since step 33 is executed second rime, the timing position of the nth correlation sequence represents the interval by which this diversity branch signal has been delayed with respect to the signal of the highest strength. Therefore, at step 35 the setting of the variable delay element 14-2 is adjusted so that the multiplier 13-2 performs despreading of this signal Using a despreading sequence delayed by $2T_c$ with respect to the timing of the strongest signal.

When control logic 21 continues to execute steps 36 to 41, the correlation sequence having the peak 63 is removed from memory 20 and those having its inherently associated sidelobes are eliminated. The process is repeated and a still weaker diversity branch signal will be detected from remaining correlation sequences and correlation sequences with the mainlobe and sidelobes of this signal are erased from memory 20. The process is continued until the variable n becomes equal to the integer K at step 36 and control returns to step 31.

The control logic 21 starts over the above process if it receives a start command signal again. Synchronization for path-diversity reception is thus retained by tracking the arbitrarily varying timing of the signals arriving on multiple paths.

What is claimed is:

1. A path-diversity CDMA receiver comprising:

means for receiving a spread spectrum radio frequency signal and producing therefrom a chip sequence;

a pseudo-noise (PN) sequence generator for producing a despreading sequence;

means, connected to said PN sequence generator, for producing a plurality of successively time shined replicas of said despreading sequence;

a plurality of correlators for detecting correlations between the chip sequence and the time shifted replicas of the despreading sequence and producing therefrom a plurality of correlation sequences, one of the correlation sequences which is produced corresponding to an intermediate one of said time shifted replicas having a maximum peak;

a memory for storing said correlation sequences;

control means for detecting a correlation sequence having said maximum peak and correlation sequences having side peaks inherently associated with said maximum peak and removing all the detected sequences from said memory, detecting a correlation sequence having a maximum peak among the correlation sequences remaining in said memory and producing a timing control signal corresponding to the detected correlation sequence;

variable delay means for introducing a delay to the despreading sequence from the PN sequence generator in accordance with said timing control signal; and a despreader for despreading the chip sequence with the despreading sequence from the variable delay means to produce a diversity branch signal.

2. A path-diversity CDMA receiver as claimed in claim 1, wherein said time shifted replicas of the despreading sequence are shifted by an integral submultiple of a chip interval of said chip sequence.

3. A path-diversity CDMA receiver as claimed in claim 2, wherein the control means is arranged to detect a plurality of neighboring correlation sequences of the correlation sequence having said maximum peak and remove the detected neighboring correlation sequences from said memory.

4. A path-diversity CDMA receiver as claimed in claim 1, further comprising means for producing an auto-correlation function of said despreading sequence, wherein said control means is arranged to detect the correlation sequences having said side peaks using said auto-correlation function.

5. A path-diversity CDMA receiver comprising:

means for receiving a spread spectrum radio frequency signal and producing therefrom a chip sequence;

a pseudo-noise (PN) sequence generator for producing a despreading sequence;

a tapped-delay line, connected to said PN sequence generator, for producing a plurality of successively time shifted replicas of said despreading sequence;

a plurality of correlators for detecting correlations between the chip sequence and the time shifted replicas of the despreading sequence and producing therefrom a plurality of correlation sequences, one of the correlation sequences which is produced by the correlator of an intermediate tap located at or near the center of the delay line having a maximum peak;

a memory for storing said correlation sequences;

control means for (a) detecting a correlation sequence having said maximum peak and correlation sequences having side peaks inherently associated with said maximum peak and removing the detected sequences from said memory, (b) detecting a correlation sequence having a maximum peak among the correlation sequences remaining in said memory and producing a first timing control signal corresponding to the detected correlation sequence, (c) detecting a correlation sequence having a maximum peak and correlation sequences having side peaks inherently associated with the maximum peak and removing the detected sequences from said memory, and (d) detecting a correlation sequence having a maximum peak among the correlation sequences remaining in said memory and producing a second timing control signal corresponding to the detected correlation sequence;

first and second variable delay means for introducing delays to the despreading sequence from the PN sequence generator in accordance with said first and second timing control signals, respectively; and first and second despreaders for despreading the chip sequence with the despreading sequences from the first and second variable delay means to produce first and second diversity branch signals.

6. A path-diversity CDMA receiver as claimed in claim 5, wherein said time shifted replicas of the despreading sequence are shifted by an integral submultiple of a chip interval of said chip sequence.

7. A path-diversity CDMA receiver as claimed in claim 6, wherein the control means is arranged to detect a plurality of neighboring correlation sequences of the correlation sequence having said maximum peak and remove the detected neighboring correlation sequences from said memory.

8. A path-diversity CDMA receiver as claimed in claim 5, further comprising means for producing an auto-correlation function of said despreading sequence, wherein said control means is arranged to detect the correlation sequences having said side peaks using said auto-correlation function.

9. A method for producing a diversity branch signal from a chip sequence transmitted by a spread spectrum radio frequency signal propagating on multiple radio paths, comprising the steps of:
   a) producing a plurality of successively time shifted replicas of a despreading sequence;
   b) detecting correlations between the chip sequence and said time shifted replicas and producing therefrom a plurality of correlation sequences, one of the correlation sequences which corresponds to an intermediate point of said time shifted replicas having a maximum peak;
   c) storing said correlation sequences in a memory;
   d) detecting, in said memory, a correlation sequence having a maximum peak and correlation sequences having side peaks inherently associated with the maximum peak and removing all of the detected correlation sequences from said memory;
   e) detecting, in said memory, a correlation sequence having a maximum peak and detecting the timing of the correlation sequence;
   f) producing a despreading sequence delayed in accordance with the detected timing; and
   g) despreading the chip sequence with the delayed despreading sequence to produce said diversity branch signal.

10. The method of claim 9, further comprising the step of repeating the steps (d) to (g).

11. The method of claim 9, wherein said time shifted replicas of the despreading sequence are shifted by an integral submultiple of a chip interval of said chip sequence.

12. The method of claim 11, wherein the step (d) comprises the steps of detecting a plurality of neighboring correlation sequences of the correlation sequence having said maximum peak and removing the detected neighboring correlation sequences from said memory.

13. The method of claim 9, wherein the step (e) includes the step of using an auto-correlation function of said despreading sequence for detecting the correlation sequences having said side peaks.

14. A method for producing a diversity branch signal from a chip sequence transmitted by a spread spectrum radio frequency signal propagating on multiple radio paths, comprising the steps of:
   a) producing a plurality of successively time shifted replicas of a despreading sequence;
   b) detecting correlations between the chip sequence and said time shifted replicas and producing therefrom a plurality of correlation sequences, one of the correlation sequences which corresponds to an intermediate point of said time shifted replicas having a maximum peak;
   c) storing said correlation sequences in a memory;
   d) setting a variable n to 1;
   e) detecting, in said memory, a correlation sequence having a maximum peak and identifying the correlation sequence having said maximum peak as an nth correlation sequence;
   f) incrementing die variable n by 1;
   g) removing the (n-1)th correlation sequence from the memory;
   h) detecting, in said memory, correlation sequences having side peaks inherently associated with the maximum peak of the (n-1)th correlation sequence and removing the detected correlation sequences from the memory;
   i) repeating the step (e) to detect a correlation sequence having a maximum peak;
   j) determining the timing of the detected correlation sequence and producing a despreading sequence delayed according to the determined timing;
   k) repeating the steps (e) to (j) to produce a plurality of the delayed despreading sequences; and
   l) despreading the chip sequence with the plurality of delayed despreading sequences to produce a plurality of said diversity branch signals.

15. The method of claim 14, wherein said time shifted replicas of the despreading sequence are shifted by an integral submultiple of a chip interval of said chip sequence.

16. The method of claim 15, wherein the step (g) comprises the steps of detecting a plurality of neighboring correlation sequences of the (n-1)th correlation sequence and removing the detected neighboring correlation sequences from the memory.

17. The method of claim 14, wherein the step (h) includes the step of using an auto-correlation function of said despreading sequence for detecting the correlation sequences having said side peaks.

* * * * *

UNITED STATES PATENT AND TRADEMARK OFFICE
CERTIFICATE OF CORRECTION

PATENT NO. : 5,796,775
DATED : August 18, 1998
INVENTOR(S) : Akio Aoyama

It is certified that error appears in the above-identified patent and that said Letters Patent is hereby corrected as shown below:

Column 2, Line 41: "policy" should read --plurality--

Column 3, Line 11: "DS-CDMA." should read --DS-CDMA--

Column 3, Line 61: "capped-delay" should read --tapped-delay--

Column 4, Line 62: "auto-or relation" should read --auto-correlation--

Column 5, Line 43: "shined" should read --shifted--

Column 8, Line 18: "die" should read --the--

Signed and Sealed this

Tenth Day of October, 2000

Attest:

Q. TODD DICKINSON

*Attesting Officer*     *Director of Patents and Trademarks*